O. NORDSTRÖM AND A. MÖRCK.
MEANS FOR CONTINUOUS PREDRYING OF FUEL.
APPLICATION FILED NOV. 10, 1920.
1,423,728.
Patented July 25, 1922.
2 SHEETS—SHEET 2.
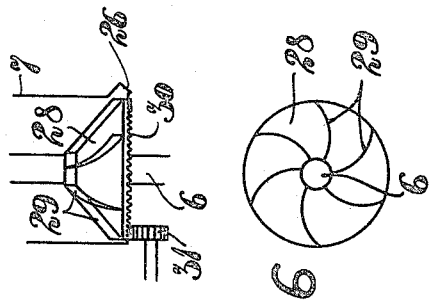
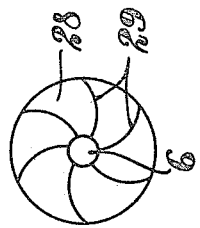
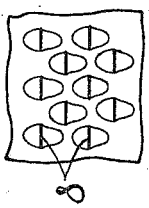
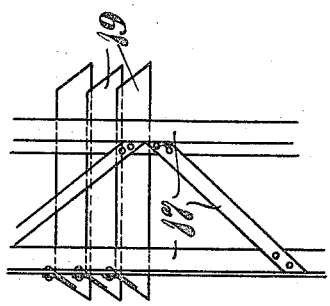
Inventors.
Otto Nordström
Arne Mörck
By [signature] Atty.

UNITED STATES PATENT OFFICE.

OTTO NORDSTRÖM, OF MATFORS, AND ARNE MÖRCK, OF SUNDSVALL, SWEDEN.

MEANS FOR CONTINUOUS PREDRYING OF FUEL.

1,423,728.	Specification of Letters Patent.	Patented July 25, 1922.

Application filed November 10, 1920. Serial No. 423,146.

*To all whom it may concern:*

Be it known that we, OTTO NORDSTRÖM and ARNE MÖRCK, subjects of the King of Sweden, whose post-office addresses are Matfors and Sundsvall, Sweden, respectively, have invented new and useful Improvements in or Relating to Means for Continuous Predrying of Fuel, of which the following is a specification.

This invention relates to means for continuous predrying of chips of wood, peat or other fuel containing, in its natural state, a comparatively great percent of water, in order to increase its thermal value, hot waste gases from a chimney or other outlet being used as a drying medium.

To this purpose the invention consists chiefly in a tower, wherein the drying process is performed, and connected with conduits for the hot gases, and means for continuous feeding of the material into and out of the tower. The tower is preferably provided with one or more pipings opening into the same and supplying the gases, said pipings being connected with means for spreading the gases through the material placed in the tower and with a ventilator introducing the gases. The tower has a perforated wall and a collecting chamber placed outside the wall and serving to receive the gases and the steam escaping through said perforations.

A preferred embodiment of the invention is illustrated in the accompanying drawing in which—

Fig. 1 is a diagrammatic sectional view of a plant constructed according to the invention. Figs. 2, 3 and 4 are detail views of said plant, and Figs. 5 and 6 show a modified form of the device feeding the material out of the tower.

In the embodiment shown the hot gases effecting the drying operation are to be supplied from a chimney 1. The gases are sucked out of the chimney through a conduit 2 connected with a fan-blower 3, the conduit 2 being provided with an adjustable air valve 4 through which cold air, if necessary, may be mixed with the gases in proper relation. The gases are forced by the fan-blower through a conduit 5 to a pipe 6 entering through the bottom of a drying-tower 7 constructed in the following manner.

The drying tower 7 is in the present case cylindrical and provided with a perforated wall, the perforations being effected for instance in the manner shown in Figs. 3 and 4 on a greater scale. Near the bottom the drying tower 7 is provided with an intermediate bottom preferably consisting of outlet hoppers 9 placed around the pipe 6. Arranged beneath the hoppers above the bottom 10 of the tower is a device for feeding the material out of the tower and preferably consisting of a toothed ring 11 rotating about the pipe 6 and gearing with a pinion 12 driven by a pulley 13 and a motor 14. Secured to the upper side of the toothed ring close to the hoppers 9 is a scraper 15, and placed on the lower side of the ring are other scrapers 16 moving close to the bottom 10.

The pipe 6 is at the top connected with a device adapted to spread the gases supplied by the pipe 6. This spreading device may preferably be constructed as shown in Fig. 2 on a greater scale and may consist of a framework 17 supporting at the top a hopper 18 (Fig. 1) below which spaced circular, conical sections 19 are attached to the framework.

The perforated wall of the tower 7 is surrounded by an annular collecting chamber 20, one or more outlet pipes 21 leading from said chamber and preferably opening into the chimney 1.

The conduit 5 is preferably provided at the ends with ash-doors 22.

The working operation of the plant described is as follows:

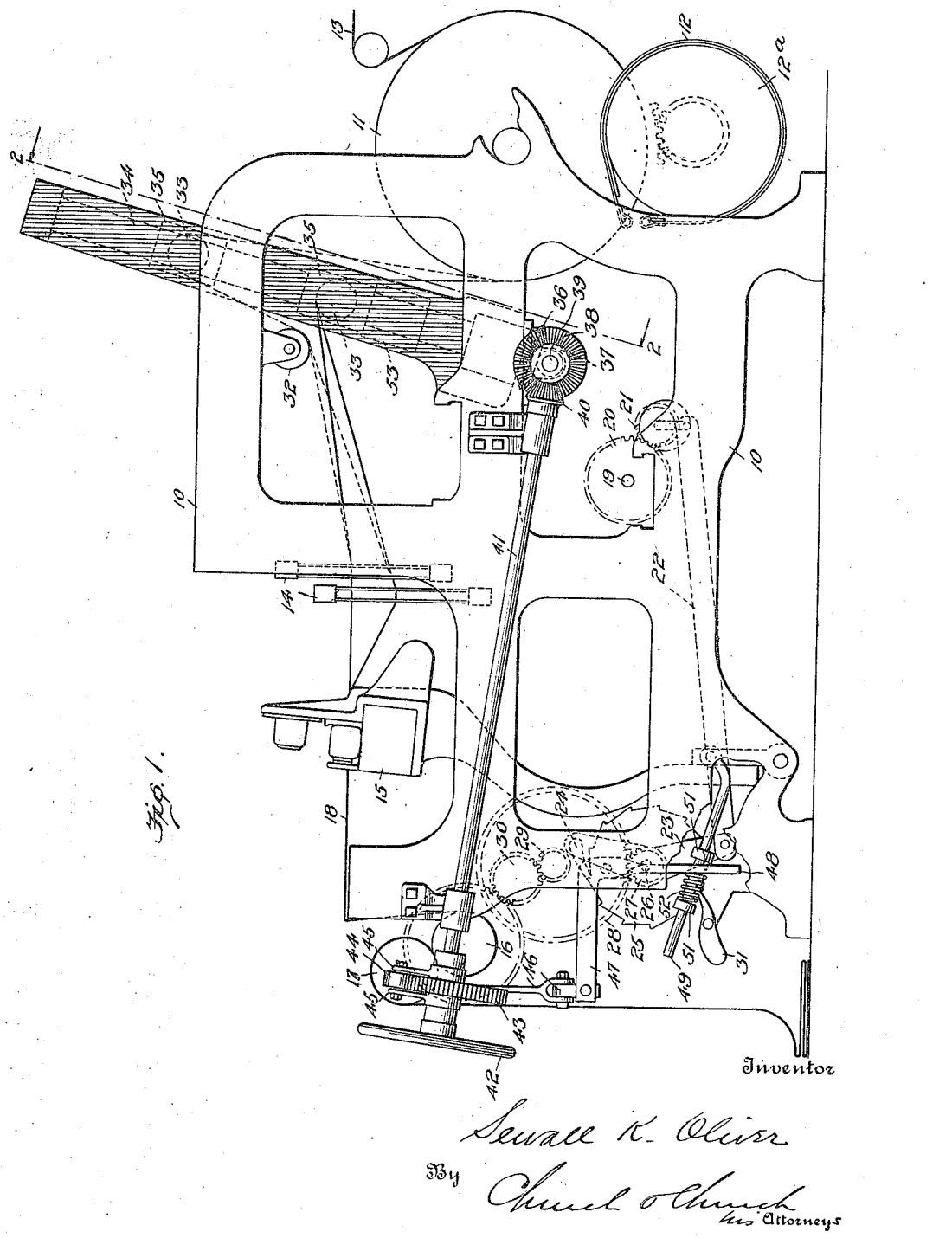

The material to be dried is filled into the tower 7 for instance by means of cable-way buckets 23, out of which it falls down into the tower through a hopper 24. The tower having been filled, the fan-blower 3 is started, the hot gases sucked in through the conduit 2 and the temperature of which may be regulated by means of the air valve 4 are forced through the conduit 5 into the pipe 6, ascend through the latter and are spread through the material in the tower by the aid of the spreading device 17, 19. The passage of the gases through the pipe 6 may, if desired, be regulated by a damper 25 placed in the same. The dried material descending through the hoppers 9 is conveyed out of the latter by means of the scraper 15, falls down through the toothed ring 11 to the bottom 10 and is moved out through an outlet opening 26 by the scrapers 16. The material falling down from said opening may be conveyed to any desired place by means of a conveyor 27 or the like. The gases and